United States Patent
Heinrich et al.

(10) Patent No.: US 12,314,943 B2
(45) Date of Patent: May 27, 2025

(54) SERVICE PAYMENT SYSTEM AND METHOD

(71) Applicant: Francotyp-Postalia GmbH, Berlin (DE)

(72) Inventors: Clemens Heinrich, Oranienburg (DE); Dirk Rosenau, Berlin (DE); Stephan Gunther, Glienicke (DE); Uwe Hubler, Neuenhagen (DE)

(73) Assignee: Francotyp-Postalia GmbH, Berlin (DE)

( * ) Notice: Subject to any disclaimer, the term of this patent is extended or adjusted under 35 U.S.C. 154(b) by 144 days.

(21) Appl. No.: 16/716,631

(22) Filed: Dec. 17, 2019

(65) Prior Publication Data

US 2020/0202351 A1    Jun. 25, 2020

(30) Foreign Application Priority Data

Dec. 19, 2018    (DE) .......................... 102018132994.6

(51) Int. Cl.
| | |
|---|---|
| G08C 15/06 | (2006.01) |
| G06F 17/00 | (2019.01) |
| G06F 21/10 | (2013.01) |
| G06F 21/70 | (2013.01) |
| G06Q 20/14 | (2012.01) |
| G06Q 20/40 | (2012.01) |
| G06Q 30/04 | (2012.01) |
| G06Q 50/06 | (2012.01) |
| G08B 23/00 | (2006.01) |

(52) U.S. Cl.
CPC .......... *G06Q 20/401* (2013.01); *G06F 21/10* (2013.01); *G06F 21/70* (2013.01); *G06Q 20/145* (2013.01); *G06Q 30/04* (2013.01); *G06Q 50/06* (2013.01); *G06Q 2220/00* (2013.01)

(58) Field of Classification Search
CPC .... G06Q 20/401; G06Q 20/145; G06Q 30/04; G06F 21/70
See application file for complete search history.

(56) References Cited

U.S. PATENT DOCUMENTS

| | | | |
|---|---|---|---|
| 6,715,246 B1 * | 4/2004 | Frecska | H01Q 1/1207 52/27 |
| 7,135,956 B2 * | 11/2006 | Bartone | H02J 13/00006 702/57 |
| 8,959,590 B2 | 2/2015 | Huebler et al. | |
| 9,501,803 B2 * | 11/2016 | Bilac | H02J 13/00006 |

(Continued)

FOREIGN PATENT DOCUMENTS

| | | |
|---|---|---|
| DE | 102011012874 A1 | 7/2012 |
| EP | 2017067587 A1 | 4/2017 |

(Continued)

OTHER PUBLICATIONS

"Hardware security module," Retrieved from "https://en.wikipedia.org/w/index.php?title=Hardware security,module&oldid=867986750", Oct. 28, 2019, 5 pages.

(Continued)

*Primary Examiner* — Talia F Crawley
(74) *Attorney, Agent, or Firm* — MaxGoLaw PLLC

(57) ABSTRACT

A system and a method of payment for services, the system includes a system component, an acquisition device and a security module.

13 Claims, 2 Drawing Sheets

(56) References Cited

U.S. PATENT DOCUMENTS

| | | | |
|---|---|---|---|
| 2003/0040842 A1* | 2/2003 | Poth | F24F 11/30 700/278 |
| 2003/0066897 A1* | 4/2003 | Carner | G05D 23/1905 236/94 |
| 2004/0076298 A1 | 4/2004 | Oliver | |
| 2005/0120012 A1* | 6/2005 | Poth | G05B 19/0428 |
| 2005/0270173 A1* | 12/2005 | Boaz | H04Q 9/00 340/870.02 |
| 2006/0173797 A1* | 8/2006 | Sheehan | G07B 17/00435 705/404 |
| 2007/0001868 A1* | 1/2007 | Boaz | G01D 4/004 340/870.02 |
| 2008/0054083 A1* | 3/2008 | Evans | G06Q 30/04 705/34 |
| 2010/0112205 A1* | 5/2010 | Chatte | G07B 17/00508 118/58 |
| 2011/0029437 A1* | 2/2011 | Lee | G06Q 20/326 705/72 |
| 2011/0125657 A1 | 5/2011 | Boss et al. | |
| 2012/0143750 A1 | 7/2012 | Gordon et al. | |
| 2012/0279787 A1* | 11/2012 | Huebler | G01G 19/005 177/145 |
| 2014/0201109 A1* | 7/2014 | Tilley | F24S 50/20 700/297 |
| 2014/0279463 A1 | 9/2014 | Pederson | |
| 2016/0106370 A1* | 4/2016 | Filipovic | A61B 5/1112 340/870.07 |
| 2018/0365776 A1* | 12/2018 | Chan | G16Y 30/00 |
| 2019/0087917 A1* | 3/2019 | Devarakonda | G06Q 10/04 |
| 2019/0311332 A1* | 10/2019 | Turney | G06Q 10/20 |
| 2020/0250109 A1* | 8/2020 | Yaacov | G06F 13/10 |

FOREIGN PATENT DOCUMENTS

| | | |
|---|---|---|
| EP | 3365633 A1 | 8/2018 |
| WO | 2017119817 A1 | 7/2017 |

OTHER PUBLICATIONS

Fournaris, et al., "Hardware Security for Critical Infrastructures, the CIPSEC project approach," 2017 IEEE Computer Society Annual Symposium on VLSI, pp. 356-361.

* cited by examiner

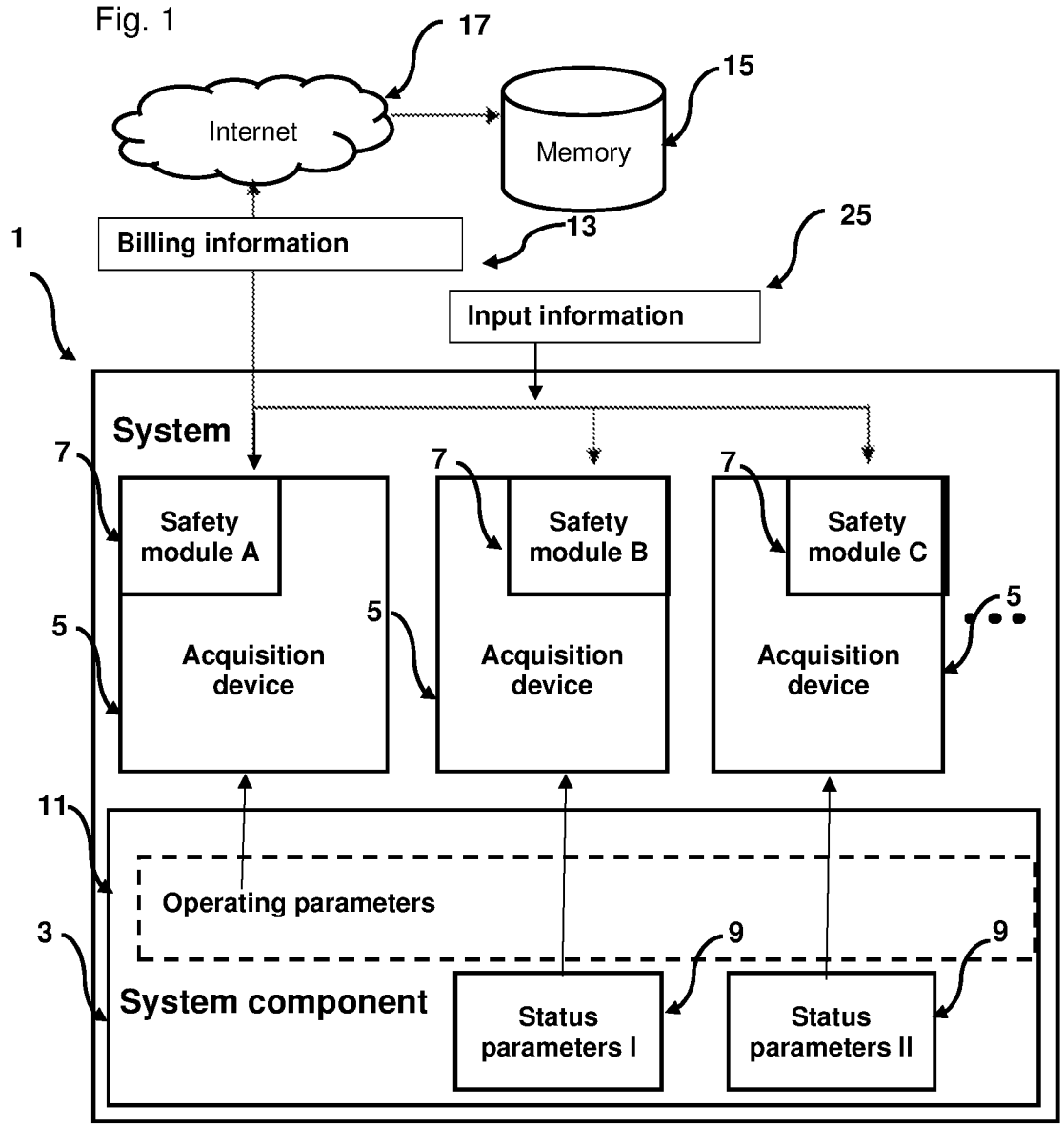

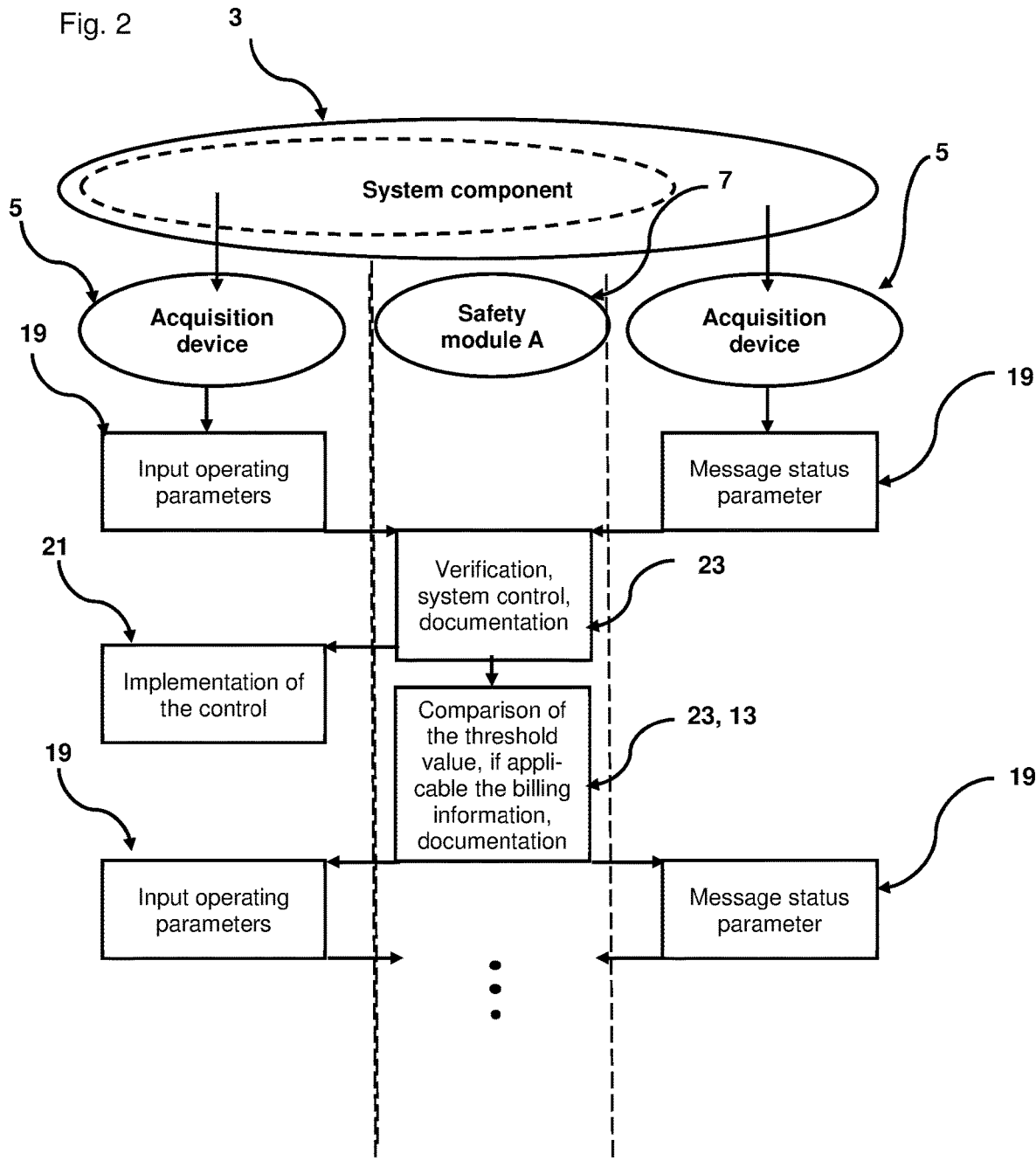

SERVICE PAYMENT SYSTEM AND METHOD

FIELD OF INVENTION

The invention relates to a system and a method of payment for services, the system comprising a system component, an acquisition device and a security module.

BACKGROUND OF THE INVENTION

There is an urgent need in the economy for secure payment methods, for example to be able to pay for services or countable quantities of a physical or virtual good, especially in the commercial B2B sector, i.e. between companies. Due to the large payment amounts involved, the payment methods to be provided are of great economic importance, which is associated with a particularly high level of requirements for the security of the payment.

SUMMARY OF THE INVENTION

It is therefore an objective of the present invention to provide a particularly secure payment system and payment method which meet the particularly high security requirements in the commercial sector when transmitting large amounts of money. The system and the method to be provided should, in particular, be technically easy to be implemented in existing systems for companies as potential customers and recipients and should also be easy to be handled for the customers of the companies, so that the payment system and method are well accepted and conveniently used.

BRIEF DESCRIPTION OF THE DRAWINGS

FIG. 1 illustrates a flow chart of a system embodiment of the present invention; and
FIG. 2 illustrates a flow chart of a process embodiment of the present invention.

DETAILED DESCRIPTION OF THE INVENTION

The objective is solved by the features of the independent claims. Advantageous features of the invention are recited in the dependent claims. According to the invention, a system of payment for services is provided, the system comprising a system component, an acquisition device and a security module. The system is characterized in that the acquisition device is adapted to acquire an acquisition value representative of a status parameter and/or an operating parameter of the system component and to send said acquisition value to the security module, the security module generating billing information as a function of the acquisition value.

In a second aspect, the invention relates to a method of payment for services comprising the following steps:
a) provision of a system comprising a system component, an acquisition device and a security module, the system component being characterized by a status parameter and/or an operating parameter,
b) acquisition of the acquisition value representative of a status parameter and/or an operating parameter by the acquisition device,
c) transmission of the acquisition value by the acquisition device to the security module,
d) generation of billing information as a function of the acquisition value by the security module.

The definitions, beneficial effects and surprising advantages of the invention described in relation to the proposed system apply by analogy to the proposed method, and vice versa. Further advantages, features and details of the invention can be obtained from the depended claims and the description below. The features mentioned therein maybe be individually or in any combination of significance for the invention. Thereby, the disclosure of the individual aspects of the invention can always be referred to reciprocally.

The components of the system are adapted in particular for data processing, wherein the components of the system comprise means or are configured/adapted for this purpose to carry out the described process steps.

An important idea underlying the invention is that a security module generates billing information, whereby payment is made for a service which preferably consists of ensuring compliance with one or more limits for one or more status parameters of the system or a system component.

It is preferred in the sense of the invention that the acquisition device comprises at least one sensor or a sensor system. The sensors of the acquisition device are adapted to detect an acquisition value representative of a status parameter and/or an operating parameter of the system component and to transmit said acquisition value to the safety module. It is preferred in the sense of the invention that the status parameters and/or the corresponding acquisition value describe parameters which act externally on the system, its component or the workstation. A status parameters could be, for example, a temperature in a room in which the workstation is located. It can also be without limitation, for example, humidity, ambient pressure, time of day, brightness, and so on. In contrast, an operating parameter preferably describes an internal variable, such as the operating temperature.

It may be preferred in the sense of the invention that the acquisition device functions in particular as a safety device and that the proposed system preferably comprises several safety devices which can communicate with each other or among themselves. It is particularly preferred that the safety devices of the workstations form a communication network with each other in which information can be exchanged. It is particularly preferred that the exchange of information and communication in the communication network, which preferably forms part of the proposed system, is secure, i.e., that it meets the requirements for security according to the FIPS standard.

It is preferred in the sense of the invention that the parameters determined within the proposed system, which describe the current states within the system or the current states of the workstations, are referred to as operating parameters. The operating parameters of the system component preferably describe the current state of the system or of a workstation which interacts with the corresponding acquisition device.

Advantageously the proposed payment system or the proposed payment method enable a secure, consumption-based payment for services or materials. For example, the proposed payment system or payment method can be employed to bill for a cleanroom ventilation. In the past, it was common for a user who wanted to use a cleanroom ventilation system to pay a fee to the provider of the system for the provision and/or installation of the system or ventilation device. Today, however, there is an increased interest in billing the use of such services depending on a user's actual consumption. This is due, for example, to the fact that incentives are to be given for resource-saving consumption behavior or that the data collected in the context of consumption-based billing is to be made available for further evaluation. Such further evaluation can be used, for example, in the context of predictive maintenance to predict when a system will need to be serviced next or to compare different but essentially similar systems with each other in a benchmarking process in order to determine deviations from a target or an average behavior or consumption values. These advantageous effects are achieved in particular by the fact that the acquisition device acquires an acquisition value representative of an operating and/or status parameter of the system component and sends said acquisition value to the safety module, the safety module generating billing information depending on the acquisition value.

In the above example, where the proposed payment system or payment method is used in connection with the billing of a cleanroom ventilation system, it may be preferable, for example, that the volume, i.e., the quantity of air converted, is recorded and billed when the cleanroom ventilation system is in operation. It may also be preferred that an energy consumption of the ventilation is determined by the acquisition device of the proposed system and forwarded to the safety device, where the corresponding billing information is generated.

The particular advantage of the proposed invention is, in particular, that the corresponding data is exchanged between the system components "securely" in the sense of the invention, for example by using FIPS-certified security devices or system components and/or by using a public key infrastructure (PKI) known to the person skilled in the art. This is particularly important in the case of payment methods and payment systems, since such systems and methods are only accepted and employed by users if they work securely and reliably and if a misuse, undesired loss of data, publication of payment transactions or manipulation are excluded. This is advantageously achieved with the proposed invention, in particular through the use of a "secure" data transmission within the system and a "secure" interaction of the security device with the acquisition devices. The secure, i.e., FIPS-certified, transmission of data within the system represents a particular advantage of the present invention.

In the sense of the invention, it is particularly preferred that the interaction of the system components in the context of the proposed invention is intelligent, i.e., smart. The terms "intelligent" and "smart" are used synonymously in the sense of the invention and are preferably understood in the sense of the invention as follows:

Conventional systems, which are known from the state of the art, often operate with fixed limits or threshold values, which are defined with regard to the state and/or operating parameters. For example, in a building ventilation system, an air conditioning system may be designed to start operating at temperatures above 20° C. In a system which is referred to as "intelligent" or "smart" in the sense of the invention, the function of the system is not or not only determined by fixed or predetermined limit or threshold values, but the smart system is preferably capable of taking into account interactions between the status parameters which preferably act externally on the system and the operating parameters prevailing within the system. In the above example, if the acquisition device of the system determines that the room to be operated as a cleanroom has a low temperature, the safety device is preferably adapted to determine that the low ambient temperature has an effect on the humidity in the room, such that different limit values can apply to the operation of the cleanroom ventilation system than it would be the case at high temperatures.

If the proposed system is used in a building ventilation and air conditioning system, for example, correlations between temperature, solar radiation, air pressure and/or humidity as status parameters on the one hand and the degree of contamination of a filter device or the amount of liquid in a room humidifier as operating parameters on the other hand can be put into relation to each other. This will preferably enable the proposed system to be able to determine consumptions within the system as a function of external status parameters, whereby the external status parameters preferably interact with the operating parameters of the system, similar to communicating tubes. Possible relations and dependencies between the preferably system internal operating parameters and the status parameters can be stored, for example, in the safety device of the system or in a storage medium within the system and/or a database, wherein the database can be for example a local component of the system or an external database enabling a remote access. It is preferred in the sense of the invention that a payment system in which interactions or relations between operating and status parameters can be taken into account when billing for services is referred to as intelligent or smart.

It is preferred in the sense of the invention that the proposed payment system or payment method can interact with other IoT systems or IoT methods, such as authorization and/or logging systems or methods. This advantageously further increases the many possible uses of the invention.

It is preferred in the sense of the invention that the security module, which can preferably also be referred to as a security device, is designed to keep or decrement an internal credit, i.e., to reduce the internal credit by a certain value. In the sense of the invention, the term status parameter preferably denotes a one- or multidimensional state vector within a vector space.

It is preferred in the sense of the invention that a device can be described at least partially or completely with the status parameter. It may also be preferred that a device can be described at least partially or completely by means of the operating parameter. The device can preferably be a component of a payment system, whereby the system proposed can preferably also be characterized as a payment system. The proposed system comprises at least one system component, one acquisition device and one security module each, the acquisition device preferably being assigned to the system components. It may be preferred in the sense of the invention that each system component is assigned to an acquisition device, but it may also be equally preferred that each system component is assigned to more than one acquisition device.

Preferably, each acquisition device generates an acquisition information so that the number of acquisition devices corresponds to the number of acquisition information. For example, if the proposed payment system includes three acquisition devices, the system will advantageously generate first, second and third acquisition information.

The acquisition information is preferably also referred to as an am acquisition value, wherein the terms are used synonymously. The payment system and the proposed payment method are described in more detail below, the terms "acquisition value" or "acquisition information" preferably relates to "at least one acquisition value" or "at least one acquisition information" respectively. It is preferred in the sense of the invention that the second, third and any further acquisition information are referred to as "further acquisition information", the further acquisition information preferably being processed and treated analogously to the first acquisition information, which is preferably generated with a first acquisition device. Also, all components mentioned in the singular, such as s system component, an acquisition device, a security module, should preferably be understood in the sense of at least one system component, acquisition device or security module.

It is intended in the sense of the invention that the security module generates billing information depending on the acquisition value. The billing information can, for example, be an invoice amount to be paid, wherein the services to be billed can, in the case of the present invention, preferably be billed according to consumption. In terms of the invention, it is preferred that an invoice amount to be paid can be deducted from an internal credit balance, which can be stored, for example, within the security device, or that the user of the system is sent a notification with a request for payment. In terms of the invention, it is furthermore preferred that the internal credit, which may be deposited in the security module, for example, can be topped up by the user, for example by means of bank transfers, for example by online banking methods. The terms security device and security module can preferably be used synonymously It is preferred in the sense of the invention that the transmission of meta data concerning billing and payment transactions and the execution of concrete payment transactions are "secure" in the sense of the invention, i.e., using FIPS certified equipment or such methods that meet the high requirements for FIPS certification. The provision of the security device operating with FIPS certification solves in particular a technical problem with technical means, namely the provision of a particularly secure data transmission within a payment system and method or the particularly secure assignment of accounting information to a specific system component.

It may also be preferable, if additional acquisition devices are present for the security module to generate the billing information as a function of the first acquisition value and/or as a function of the further acquisition values.

The proposed payment system comprises a system component, an acquisition device and a security module, the acquisition device being adapted to detect and send to the security module an acquisition value representative of a status parameter and/or an operating parameter of the system component. In other words, an acquisition value is determined and/or detected by the acquisition device and transmitted to the safety module. It is preferred in the sense of the invention that the acquisition value characterizes a status and/or an operating parameter of the system component or represents this status or operating parameter. In the sense of the invention, the term status parameter preferably describes a one- or multi-dimensional state vector within a vector space, wherein a state vector is preferably adapted to describe one or more properties of a system component or preferably its operating parameters, the vector form of which is preferably also referred to as state vector. As an example, the status parameters for controlling a cleanroom can be air humidity, temperature and pressure, which span a corresponding 3-dimensional vector space.

It is preferred in the sense of the invention that a one-dimensional state vector can be used to describe a property of a system component, whereas a multidimensional state vector can describe several properties of a technical device.

Analogous considerations apply preferably to a state vector which describes operating parameters.

It is preferred in the sense of the invention that the acquisition value is an operating parameter of the system component, wherein the operating parameter is selected from a group comprising (operating) temperature, (operating) pressure, operating fluid level, operating fluid throughput, operating fluid quality value, emission and/or pollutant discharge. It may also be preferred that the acquisition value is a condition parameter, wherein the condition parameter is selected from the group comprising temperature, solar radiation, (air) pressure, (air) humidity. The system component can preferably be a technical device or a technical apparatus. The device itself, an area within the device, or an object processed with the device can have a certain temperature, wherein this temperature can represent an example of an operating parameter and/or a status parameter of the system component, depending on whether it is an internal or an external variable. For example, if the system component is formed by a franking machine comprising a printing unit which must reach a minimum temperature for printing envelopes, the actual temperature of the printing unit may be an operating parameter of the system component "franking machine". It may be preferred that an operating parameter and/or a status parameter is assigned an upper and/or a lower threshold value, within whose range operation of the system component can take place, or within whose range the system component is operational. This is preferably also described in the sense of the invention by the formulation that one threshold value or several threshold values for one or several operating and/or status parameters of the system or a system component are complied with.

A further example for this relates preferably to the detection of an exhaust emission of a vehicle, which describes in particular the status parameter of the system component vehicle and can preferably be converted into an acquisition value by a sensor for air pollution as an acquisition device. Depending on the acquisition value, emission-dependent billing information can then be generated for the vehicle, for example.

The operating parameter and/or status parameter, which preferably describes the state of a system component and which is preferably reflected in the acquisition value detected by the acquisition device of the corresponding system component, may also be an internal credit, preferably managed by the security module. The security module may, for example, be part of the system component. For example, the security module can form an internal device of the system component "franking machine". The franking machine can be charged with credit, wherein the credit is preferably loaded onto the franking machine by a user or operator in order to use the credit for franking letters.

For example, the franking machine may store a credit value that corresponds to an amount of money that a user has used to top up a franking machine in order to frank his daily outgoing mail. If an envelope is now being franked, a numerical value can be assigned to this franking operation, depending on the postal product selected for franking the envelope. This could be, for example, without limitation a postage amount for a standard letter, a Maxi letter or a registered letter. Triggered by the franking process, the credit value stored in the franking machine is reduced by the numerical value that corresponds to or is assigned to the postal product. Such a reduction is preferably referred to as decrementation of the credit value in the sense of the invention.

The franking machine may preferably have a main board, a printing system for issuing or printing letters, a display and mechanical devices for conveying envelopes or label strips.

Various software applications can be installed and operated on the main board of the franking machine. It is preferred in the sense of the invention that corresponding postage values or postage codes are printed directly on an envelope or a label strip. The printing of a postage code on an envelope or a label strip is preferably referred to in the sense of the invention as "generating an imprint". It is preferred in the sense of the invention that the imprint is generated by means of the preferably cryptographically operating security module.

The operating parameter of the system component, described by the acquisition value that the acquisition device associated with the corresponding system component detects, may also be, for example, a pressure, a level of filling, a quality parameter and/or an emission value for a pollutant. If the system component providing a service is, for example, an air compressor, the operating parameter can, for example, describe the pressure within the compressor or the amount of compressed air stored in the compressor, wherein this can also represent, in a preferred embodiment, a status parameter in the sense of an external variable of the system component. These operating parameters and/or status parameters can be determined by an acquisition device assigned to the air compressor and forwarded to the safety module as an acquisition value. The acquisition value can then be used as a basis for generating a bill for the compressed air consumed by a consumer. This is done in the sense of the invention by the fact that the safety module generates billing information depending on the acquisition value.

In a preferred embodiment, the security module is adapted to receive input information and to generate billing information depending on the acquisition value and the input information.

An "input information" preferably refers to information that the system receives from an external source, for example, an external server, and which refers to a settlement with regard to an acquisition value.

For example, the input information can be a specification of settlement requirements or changes to settlement requirements. In particular, the input information can include prices or price changes with regard to the creation of settlement information based on the acquisition value.

With regard to an exemplary application in a ventilation and air-conditioning system, for example, the price relation for a quantity of converted air (volume) or an energy consumption of the ventilation and air-conditioning system can be changed or defined by the input information. Preferably, this can also be done with regard to operating and status values. The updated price relation as input information for the generation of the billing information can thus, as described, also relate to correlations between temperature, solar radiation, air pressure and/or air humidity as status parameters on the one hand and the degree of soiling of a filter device or quantity of liquid in a room humidification device as operating parameters on the other hand.

This allows a quick and flexible response to both current market developments and possible changes in the terms and conditions of a business relation between a customer and the service provider. The implementation of discounts, cancellations, premium prices or flat rates can be carried out quickly and securely.

By providing an external input information and the described processing by means of the security module, it is advantageously possible to react to changes in a simple, secure and robust way and to adapt the billing information accordingly.

The provision of the proposed payment system and payment method is particularly advantageous because a change in business models can be observed in the economy and industry. For example, when renting out air compressors, it is no longer the service life or the operating time of the compressor that is used as a technical figure to determine a rental fee, but often the quantity of compressed air actually delivered by the compressor. The quantity of this compressed air can be recorded, forwarded, processed and invoiced particularly easily with the proposed system and method. This is made possible in particular by the combination of the system equipment, such as system component, acquisition device and safety module, and their functional interaction, as described herein. In particular, the proposed payment system and the proposed payment method satisfy a technical need for uncomplicated and particularly secure payment methods and systems, especially in the commercial B2B sector. A particular advantage of the invention is that it provides a particularly secure pay-per-use method that can be employed in many different technical and economic areas.

The payment method is characterized in particular by the following method steps:
   a) provision of a system comprising a system component, an acquisition device and a security module, the system component being characterized by a status parameter and/or an operating parameter,
   b) acquisition of the acquisition value representative of a status parameter and/or operating parameter by the acquisition device,
   c) transmission of the acquisition value by the acquisition device to the security module,
   d) generation of billing information as a function of the acquisition value by the security module,
wherein the method may include further optional method steps.

The provision of a system component characterized by a status parameter and/or operating parameter can be realized, for example, by providing a device that provides a billable service, such as the delivery of compressed air, whereby in particular the quantity of the delivered compressed air is measurable and quantifiable. The quantity of the delivered compressed air can therefore preferably be used as a basis for the generation of billing information by the safety module, wherein the quantity of the delivered compressed air can be characterized by the status parameter and/or the operating parameter of the system component, for example the air compressor. An operating parameter could relate to the number of movements of an air pump, a status parameter could be, for example, directly relating to the volume of the pumped air. These parameters can be assigned an acquisition value or a detection information by the acquisition device, which can be forwarded or transmitted to the safety module by the acquisition device. Preferably, both parameters can also be used to avoid incorrect billing and to increase safety. Billing information is then generated in or by the security module depending on the transmitted acquisition value. It is particularly preferred in the sense of the invention that the acquisition value is both an operating parameter and one or status parameter of the system component, or describes such a parameter.

It is preferred in the sense of the invention that the security module comprises or is formed by a Hardware Security Module (HSM). The HSM can preferably also be part of the system component. It is preferred in the sense of the invention that the HSM is a hardware-based cryptographic module which preferably has a FIPS 140-2 certification. It is preferred in the sense of the invention that the formulation that a device operates safely technically means that the corresponding device has such a FIPS certification. Preferably, it may also mean that the device comprises or is comprised of a public key infrastructure. The HSM may be formed by or include a single chip module, a stand-alone multi-chip module or an embedded multi-chip module. The HSM is preferably designed to store data in a particularly secure manner. In particular, an HSM is capable of generating, storing, using and/or maintaining critical security parameters such as passwords, confidential data or keys for encrypting data. The keys can be symmetric or asymmetric, for example. Advantageously, HSM can be used as cryptographic coprocessors. In preferred embodiments, an HSM can have a battery-powered circuit and/or voltage monitoring. This enables the integration or provision of a real-time clock for correct time recording and time stamping, which can ensure, for example, that expired keys may no longer be used. In addition, an HSM may include a redundant memory, which may be used, for example, to employ several technologies simultaneously to generate additional data security.

It is preferred in the sense of the invention that an HSM comprises a chain of certificates which are preferably loaded onto the device before the HSM is put into operation. In addition, the HSM is adapted to generate its own private and public device keys. Preferably, the private key does not leave the HSM at any time while the public key can be handed over to the outside, for example to an external server for a signing. In return, the HSM can receive a personalized, signed device certificate, with which the HSM can significantly increase security in an Internet of Things (IoT) system. The HSM can then be recognized and authenticated by the external server as a "genuine" security device, which is made possible in particular by assigning a unique identifier. In this way, authenticated TLS (Transport Layer Security) connections can be established in a particularly uncomplicated manner. Preferably at least one public key infrastructure known to a person skilled in the art is used for this purpose.

Preferably, the billing information is created based on a comparison of the acquisition value with at least one threshold value, preferably a threshold value of the acquisition value. It is particularly preferred that threshold value can be an upper threshold value and/or a lower threshold value. It is preferred in the sense of the invention that the upper and lower threshold values correspond to the threshold values for the operating and/or status parameter of the system or a system component and thus describe the range in which the operation of the system or the system component may take place. In other words, a settlement can preferably always be made when the operating and/or status parameters exceed the threshold or limit values which allow permissible operation of the system or a system component.

In another preferred embodiment of the invention, the security module is adapted to verify the acquisition information or the acquisition value. This is preferably enabled by encrypting the acquisition information before it is transmitted to the security module. The security module compares the encrypted acquisition information with its own private key and can thus verify the authenticity of the acquisition information. It may also be preferable for a digital signature to be made by the acquisition device, preferably by means of the private key, which can be verified and/or authenticated by the security module, e.g., by the public key associated with the private key.

It is preferred in terms of the invention that the security module is adapted to secure the acquisition information and/or the billing information with cryptographic means. This protection can be achieved, for example, by signing and/or encrypting the acquisition information and/or the billing information. In other words, in the sense of the invention, it is preferred that the security module is adapted to secure the acquisition information and/or the billing information by cryptographic means. This can be done, for example, by a preferably digital signature of the acquisition and/or billing information. Preferably, the security module has cryptographic capabilities that are used in the generation of the digital signature in order to achieve or enhance encryption of the transmitted information. Preferably, the security module shall include cryptographic means for this purpose, such as a processor with high computing power, with the aid of which information, messages and/or transactions can be transmitted and/or signed in encrypted form in the proposed system. Preferably, the security module is part of a public key infrastructure.

In a further preferred embodiment of the invention, the security module comprises a memory device, wherein the acquisition information and/or the billing information can be stored in the memory device. In this way, the stored information can be used or read out for other purposes at a later time or assigned to a specific user profile. It may be preferable in the sense of the invention to store the billing information locally or to access the billing information remotely. The local storage of the billing information within the system, for example at the location where the data is generated and/or collected, allows for a pre-filtering of the data, so that, for example, not all data or data sets need to be transferred from the acquisition device to the security device, but only a significantly smaller amount of data. The fact that less data has to be transferred saves transfer resources in total and the relevant data can be transferred more quickly and with less effort.

It may also be preferred in the sense of the invention that the security module is adapted to store the acquisition information and/or the billing information in a cloud. This allows to dispense the provision of a storage space within the security module, thus saving space or to provide a particularly compact security module. If the data is stored in a cloud, the data from different systems or different system components can be compared with each other, for example, in order to determine average values or deviations within the framework of a benchmarking process or to identify systems and system components that are operating "on target" or with particularly high consumption. This data can then be used advantageously in the context of predictive maintenance or remote maintenance to optimize the operation of a system or facility.

It is preferred in the sense of the invention that the security module is adapted to establish a preferably cryptographically secure link between the acquisition information and/or the accounting information on the one hand and an ID of the system component, an ID of the acquisition device, an ID of the security module and/or a time stamp on the other hand. In other words, it may be preferable in the sense of the invention to establish a particularly secure link between the acquisition information and an ID of the system component,
    the acquisition information and an ID of the acquisition device,
    the acquisition information and an ID of the safety module,
    the acquisition information and a time stamp,
    the billing information and the ID of the system component, the billing information and the ID of the acquisition device, the billing information and the ID of the security module and/or the billing information and the time stamp.

In particular, the proposed payment system and the proposed payment method allow costs to be clearly assigned to a specific system component or a specific cause of costs. Thus, the invention enables an improved data processing, for example, in that billing information can be assigned to a specific cost center in a particularly simple and uncomplicated manner or that in a technical operation it is made unambiguously, and comprehensibly transparent which systems or system components operate economically or with an average consumption and which further system components do not. The features of the proposed system and the steps of the proposed method preferably allow for a secure transmission and allocation of data in the sense of the invention, which are in particular secure against manipulation or abuse. This increases acceptance of the proposed invention and confidence in payment systems and methods. A preferably cryptographically secure link means in particular to apply a FIPS certified security of the link. In particular, it can also mean using a public key infrastructure that meets high security requirements and is FIPS certified.

The invention is described in more detail in the following figures. It is noted that the drawings are merely of exemplary nature to clarify the invention and not intended to be limiting.

FIGS. 1 and 2: Flow Charts for illustrating the invention

FIG. 1 schematically depicts a system 1 for the payment of services, which comprises a system component 3, an acquisition device 5 and a safety module 7. The system component is characterized both by an operating parameter 11, which describes an internal quantity of the system component 3, which is preferably meaningful for the operating state, and, in the present example, by two status parameters 9, which preferably describe external quantities applied to the system component 3. Both operating 11 and status parameter 9 can be described as quantities by a representative acquisition value 19 which is detected by the acquisition device 5. In the process, the safety module 7 generates a billing information 13 as a function of the acquisition value 19. In this case it may be preferred that the safety module 7 is provided with an input information 25 so that the billing information 13 is generated on the basis of the acquisition value 19 and the input information 25. The billing information 13, in turn, can be stored, preferably in conjunction with the detection information, in a storage device (abbreviated: memory) 15. The storage device 15 can also be present in a network, e.g., the internet 17, wherein the storage is preferably carried out in a cloud. In particular the communication within the network should be secured by cryptographic means, e.g., by using a public key infrastructure and/or a block chain. A safety module 7 in the form of an HSM can be used for this purpose.

FIG. 2 schematically illustrates an exemplary process flow in system 1. Herein, the operating parameter 11 as internal quantity of the system component 3 as well as the status parameter 9 as an external quantity can be detected by the acquisition device 5, which generates a representative acquisition value 19 based on these quantities. Said acquisition value 19 is transferred to the safety module 7, where, in addition to the generation of a billing information 13, further process steps 23 of the safety module 7 can preferably be executed depending on the acquisition value 19.

For example, a verification of the acquisition value 19 can be performed. This process step preferably includes ensuring that the acquisition value has been transferred by a previously authorized acquisition device 5. For example, this can be achieved by an authentication typically employed in a public-key method, e.g., by using digital signatures and/or certificates. Preferably after the verification has been carried out, the safety module z releases a controller which, for example, triggers a controller of system component 3. Preferably all occurring processes can also be documented. As the next process step 23, which was preferably triggered by the previous ones, a billing information 13 can then be generated, especially if this results from the comparison of an acquisition value 19 with a threshold value. The described process flow can be continued as desired.

Reference Character List 1 system
3 system component
5 acquisition device
7 safety module
9 status/condition parameters
11 operating parameters
13 billing information
15 memory
17 internet
19 acquisition value
21 control parameters
23 process step of the safety module
25 input information

What is claimed is:

1. A system (1) for a consumption-based payment for services or materials, the system (1) comprising a franking machine (3), an acquisition device (5) and a security module (7), wherein the acquisition device (5) comprises at least two sensors adapted to acquire an acquisition value (19) representative of a status parameter (9) and an operating parameter (11) of the franking machine (3) and to transmit said acquisition value (19) to the security module (7), the security module (7) comprising a processor, and wherein the security module (7) generates a billing information (13) as a function of said acquisition value (19) acquired by the at least two sensors, wherein a first sensor is adapted to acquire the status parameter (9) describing a system-external parameter, which acts externally on the franking machine (3) and is selected from a group comprising a temperature, a pressure or a humidity of an environment in which the franking machine (3) is situated and wherein a second sensor is adapted to acquire the operating parameter (11) describing a system-internal parameter, which describes the current state or usage of the franking machine (3); and wherein the acquisition value (19) is further analyzed and evaluated for predictive maintenance by notifying a user of the system of the acquisition value (19), and performing the predictive maintenance based upon the analysis of the acquisition value (19) representative of the status parameter (9) and the operating parameter (11) of the franking machine (3).

2. A method for a consumption-based payment for services or materials, comprising:

a) provision of a system (1) comprising a franking machine (3), an acquisition device (5) comprising at least two sensors, and a security module (7), the security module (7) comprising a processor, wherein the franking machine (3) is characterized by a status parameter (9) and an operating parameter (11), b) acquisition of an acquisition value (19) representative of a status parameter (9) and operating parameter (11) by the at least two sensors of the acquisition device (5), wherein a first sensor acquires the status parameter (9) describing a system-external parameter, which acts externally on the franking machine (3) and is selected from a group comprising a temperature, a pressure or a humidity of an environment in which the franking machine (3) is situated and wherein a second sensor acquires the operating parameter (11) describing a system-internal parameter, which describes the current state or usage of the franking machine (3), c) transmission of the acquisition value (19) by the acquisition device (5) to the security module (7), d) generation of a billing information (13) as a function of the acquisition value (19) acquired by the at least one sensor by the security module (7), e) using the acquisition value (19) to suggest predictive maintenance, f) notifying a user of the system of the acquisition value (19), and g) performing the predictive maintenance based on the analysis and evaluation of the acquisition value (19) representative of the status parameter (9) and the operating parameter (11) of the franking machine (3) to return to "on target" operational consumption.

3. The system (1) according to claim 1 wherein the security module (7) is formed by a Hardware Security Module (HSM).

4. The system (1) according to claim 1 wherein the operating parameter (11) is selected from a group comprising of at least one of (operating) temperature, (operating) pressure, operating fluid level, operating fluid throughput, operating fluid quality value, emission, internal credit and pollutant emission.

5. The system (1) according to claim 1 wherein the billing information (13) is generated depending on a comparison of the acquisition value (19) with at least one threshold value.

6. The system (1) according to claim 1 wherein the security module (7) is adapted to receive input information (25) and to generate billing information (13) as a function of the acquisition value (19) and the input information (25).

7. The system (1) according to claim 1 wherein the security module (7) is arranged to verify the acquisition value (19).

8. The system (1) according to claim 1 wherein the security module (7) is adapted to secure at least one of the acquisition value (19) or the billing information (13) with cryptographic encryption.

9. The system (1) according to claim 1 wherein the security module (7) comprises a memory device (15), wherein the acquisition value (19) and/or the billing information (13) is stored in the memory device (15).

10. The system (1) according to claim 1 wherein the security module (7) stores one or more of the acquisition value (19), the billing information (13) in a cloud, or a combination thereof.

11. The system (1) according to claim 1 wherein the security module (7) is adapted to establish a cryptographically secured link between one or more of the acquisition value (19) and the billing information (13) on the one hand and an ID of the franking machine (3), an ID of the acquisition device (5), an ID of the security module (7), a time stamp on the other hand, or a combination thereof.

12. The system (1) according to claim 1 wherein the status parameter (9) is selected from a group comprising one or more of temperature, solar radiation, (air) pressure, (air) humidity and air pollution.

13. The system (1) according to claim 1 wherein for generating a billing information interrelations or dependencies between the system-internal operating parameters and the system-external status parameters are taken into account.

* * * * *